United States Patent [19]

Calhoun

[11] Patent Number: 5,048,558

[45] Date of Patent: Sep. 17, 1991

[54] VALVE SEAT AND METHOD OF REPAIR

[76] Inventor: Carl R. Calhoun, 6200 S. County Rd. 1210, Midland, Tex. 79703

[21] Appl. No.: 647,283

[22] Filed: Jan. 29, 1991

Related U.S. Application Data

[63] Continuation of Ser. No. 526,507, May 21, 1990.

[51] Int. Cl.⁵ .................... F16K 43/00; F16K 51/00
[52] U.S. Cl. .................... 137/407; 137/315; 137/396; 137/510; 156/98; 156/256; 156/293
[58] Field of Search ............... 137/130, 132, 134, 315, 137/396, 403, 406, 407, 453, 510; 251/359, 360, 363, 364; 156/94, 98, 256, 257, 293

[56] References Cited

U.S. PATENT DOCUMENTS

| | | | |
|---|---|---|---|
| 1,681,233 | 8/1928 | Hart | 251/360 |
| 2,586,410 | 2/1952 | Williams | 137/403 |
| 2,670,006 | 2/1954 | Parks | 137/407 |
| 2,720,891 | 10/1955 | Glasgow | 137/407 |
| 2,768,644 | 10/1956 | Crawford | 137/510 |
| 2,842,335 | 7/1958 | Cousins | 251/335.2 |
| 2,920,861 | 1/1960 | Hartman | 251/360 |
| 3,044,743 | 7/1962 | Siegel | 251/363 |
| 3,362,680 | 1/1968 | Weiss | 251/360 |
| 3,755,876 | 9/1973 | Beasley | 29/890.121 |
| 4,134,572 | 1/1979 | Schmidt | 137/315 |

Primary Examiner—George L. Walton
Attorney, Agent, or Firm—Browning, Bushman, Anderson & Brookhart

[57] ABSTRACT

A valve seat for a valve used with a treater tank comprising a body having a generally cylindrical bore threthrough, the body having a first end, a second end and being made of metal, the first end having a counterbore concentric with the cylindrical bore, the body having means on the second end for mounting the valve seat in the valve and an insert carried by the body and received in the first end, the insert being comprised of an erosion-resistant synthetic polymeric material having a cylindrical passageway therethrough, the insert having a first portion defining first inner and outer concentric cylindrical surfaces, the first outer surface having a diameter greater than the diameter of the counterbore, an annular sealing surface being formed on the first portion, and a second, generally cylindrical portion, said second portion being received in the counterbore and means disposed between the body and the second portion to secure the insert to the body and effect fluid-tight sealing between said insert and said body.

7 Claims, 2 Drawing Sheets

FIG.1
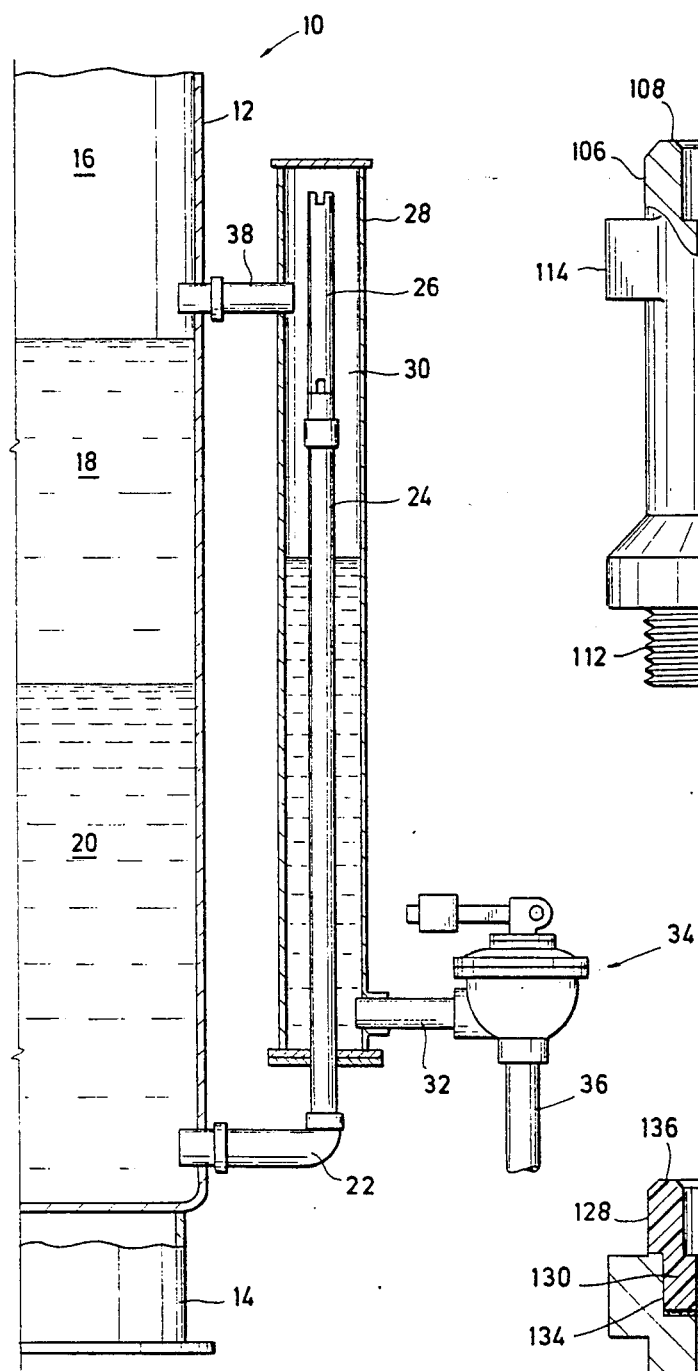
FIG.3
(PRIOR ART)
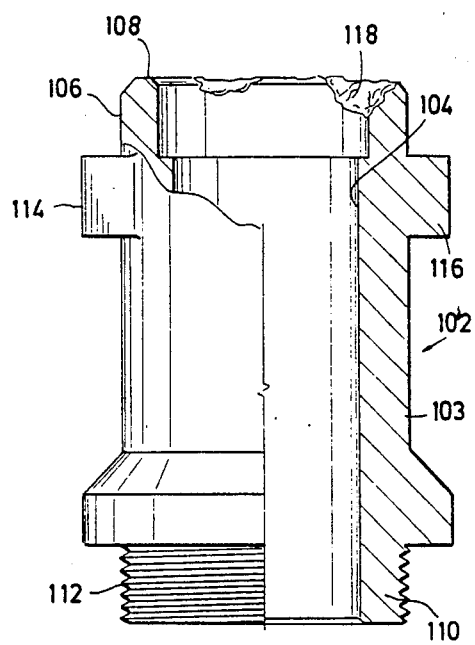
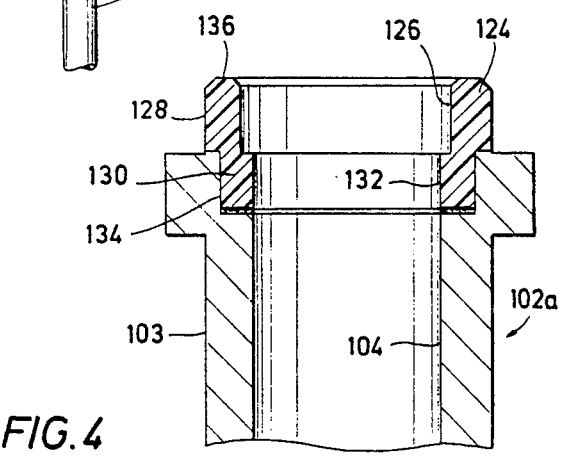
FIG.4

VALVE SEAT AND METHOD OF REPAIR

This is a continuation of application Ser. No. 07/526,507, filed May 21, 1990, pending.

BACKGROUND OF THE INVENTION

1. Fild of the Invention

The present invention relates to a valve seat used with a diaphragm valve in a so-called treater tank and to a method of repairing eroded valve seats used in such valves.

2. Description of the Background

Treaters, or vertical treater tanks, are used in the oil and gas industry to separate the components of an emulsion pumped from an oil well. Typically, such an emulsion contains salt water, oil and natural gas. The salt water from a group of wells is collected in a central location tank and then pumped back to the downhole formation. The oil, separated from the water and gas, is collected in storage tanks which are periodically emptied into tank trucks for transfer to a refinery. The gas which is separated is directed to a suitable pipeline for transfer to market.

The vertical treaters or treater tanks employed are described, for example, in a publication entitled "Vertical Treater start-Up Operational and maintenance Guide, " C-E Netco, Combustion Engineering, Inc., December, 1962. The vertical treaters employ check valves to effect and control flow of the oil and water to their respective collection tanks. The operation and construction of such valves is well known to those skilled in the art and described, for example, in a publication entitled "Treater Oil and Water Valves," Kimray, Inc., September 1986.

Basically, the valves in the treater have a valve seat formed of a generally tubular, metallic body with a cylindrical bore therethrough. The valve seat is threadedly received in the lower part of the valve body, the other end of the valve seat forming a sealing surface which is engaged by a seal element carried by a diaphragm assembly which, when engaged with the sealing surface on the valve seat, closes the valve and when retracted from the sealing surface opens the valve. The body of the valve seat adjacent the annular sealing surface is prone to erosion because of cavitation. When this occurs, a fluid-tight seal is lost with the consequence that valuable amounts of gas which is used as the driving force are lost, the gas escaping to the water or oil collection locations. Accordingly, it becomes necessary to shut down the operation of the treater, remove the valve seat and replace it with a new valve seat. Thus, the erosion of the valve seats is expensive, since it results in substantial losses of marketable gas and because the new valve seats are costly to replace.

SUMMARY OF THE INVENTION

It is therefore an object of the present invention to provide an improved valve seat for a valve used in a vertical treater.

Another object of the present invention is to provide a method for repairing an eroded valve seat for a valve used in a vertical treater to effect separation of oil, gas and water collected from an oil well.

The above and other objects of the present invention will become apparent from the drawings, the description given herein and the appended claims In one embodiment, the present invention provides a valve seat for a valve used with a treater tank, the valve seat including a body which has a generally cylindrical bore therethrough, a first end and a second end. The body is made of metal and the first end has a counterbore which is concentric with the cylindrical bore, the counterbore having an axial depth D. Means are provided on the second end of the body, typically by threads, for mounting the valve seat in the valve. The valve seat further includes an insert carried by the body and received in the first end. The insert is comprised of an erosion-resistant, synthetic polymeric material and has a cylindrical passageway therethrough. The insert has a first portion which defines first, inner and outer, concentric cylindrical surfaces. The first outer cylindrical surface having a diameter greater than the diameter of the counterbore. An annular, generally axially facing, sealing surface is formed on the first portion. The insert further includes a second, generally cylindrical portion which is received in the counterbore. Means are disposed between the body and the second portion of the insert to secure the insert to the body and form a fluid-tight seal therebetween.

In another embodiment of the present invention, there is provided a method of repairing a valve seat for a valve used with a treater tank in which the valve seat comprises a metal body having a first end and a second end and defines a cylindrical bore extending therethrough, a counterbore being formed in the first end of the body and defining an annular sealing surface and in which a portion of the body defining the sealing surface and generaly extending into the counterbore has been eroded. In the methos, a portion of the first end of the body is removed so as to substantially eliminate the eroded portion on the sealing surface and form a new first end. A new counterbore is then formed in the new first end of the body, the new coiunterbore being concentric with the cylindrical bore. The method further includes forming an insert comprised of an erosion-resistant synthetic polymeric material, the insert having a passageway therethrough. The insert is formed to have a first portion which defines first, inner and outer, concentric cylindrical surfaces, the first outer cylindrical surface having a diameter greater than the diameter of the new counterbore and providing a new annular sealing surface. The insert is formed to also have a second portion which defines second, inner and outer, concentric cylindrical surfaces, the second other surface having a diameter sufficiently less than the diameter of the new counterbore to permit the second portion to be received in the new counterbore but sufficiently large enough to prevent any substantial lateral movement of the second portion relative to the new counterbore. The second portion of the insert is positioned in the new counterbore. Securing of the second portion of the insert to the body is accomplished with an adhesive disposed between the second portion and the body.

BRIEF DESCRIPTION OF THE DRAWINGS

FIG. 1 is a fragmentary, elevational view, partly in section, of a vertical treater employing a check valve utilizing the valve seat of the present invention.

FIG.3 is an elevational view, partly in section, showing a valve seat in which a portion of the sealing surface has been eroded away.

FIG. 4 is an elevational sectional view of the valve seat of the present invention.

DESCRIPTION OF THE PREFERRED EMBODIMENTS

Figure 2:
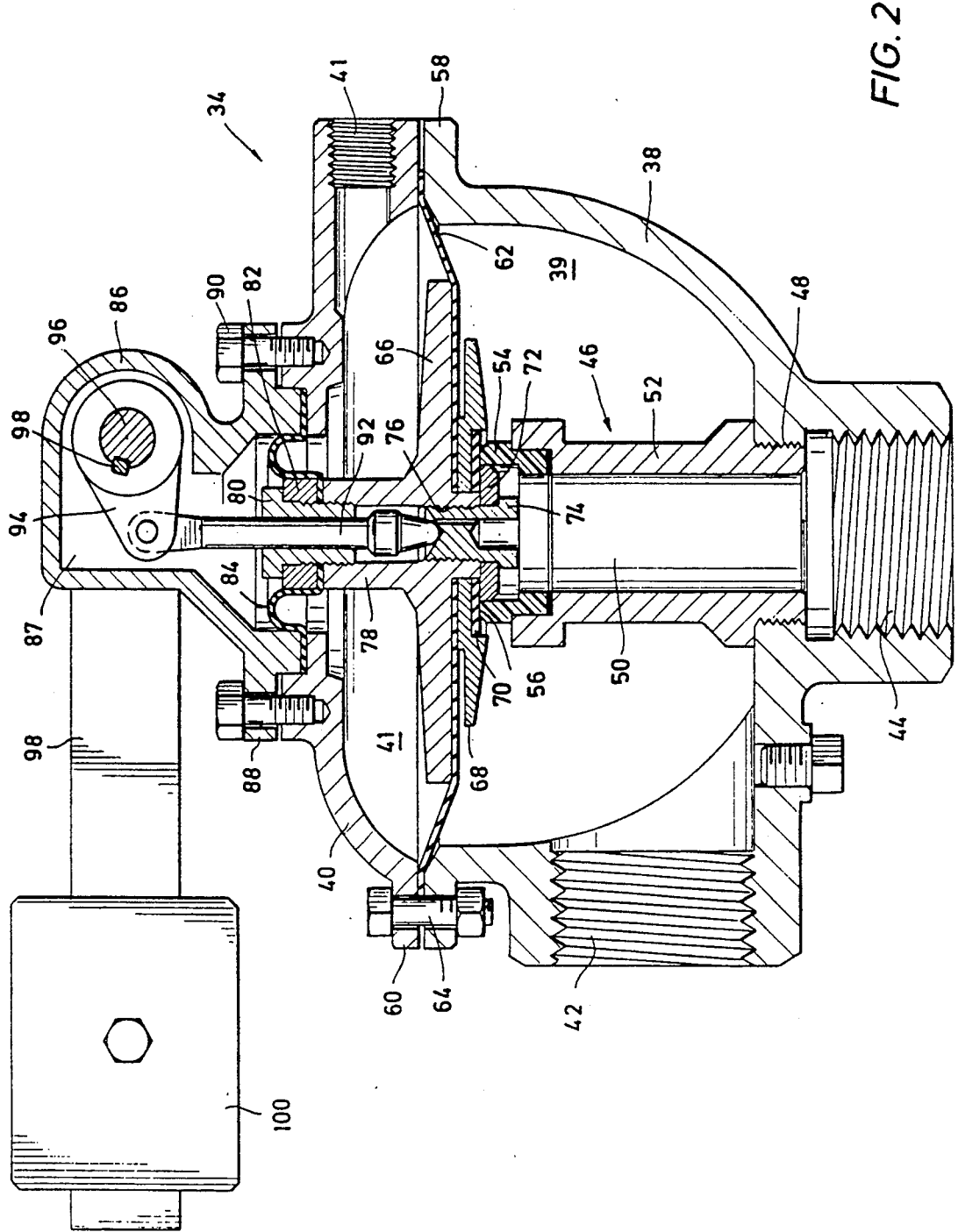
FIG. 2 is a partial elevational veiw, partly in section, of the check valve assembly.

Referring first to FIG. 1, the vertical treater, shown generally as 10, includes a tank 12 which rests on a suitable support 14. As indicated above, the vertical treater 10 is used to separate an oil, water and gas mixture collected from an oil well. The gas 16 in the treater is located in the uppermost portion of the tank 12, while the oil 18 is disposed intermediate the gas 16 and a water phase 20. Water 20 is removed from tank 12 by means of a water outlet 22 which is disposed adjacent the bottom of tank 12. A syphon leg 24 extends vertically upwardly from outlet 22 and terminates in a syphon nipple 26. An outside syphon tube 28 surrounds syphon leg 24 and nipple 26 and forms an annulus 30. Annulus 30 is connected by conduit 32 to a diaphram-type check valve shown generally as 34 and described more fully hereafter. Water flow out of valve 34 to a suitable collection vessel (not shown) is accomplished by a conduit 36. The annulus 30 is in open communication with the gas phase 16 by means of a connecting conduit 38. The detialed structure and operation of vertical treaters and treater oil and water valves of the type in which the valve seat of the present invention is used is disclosed in "Vertical Treater Start-Up —Operational and Maintenance Guide," C-E Natco, Combustion Engineering, Inc., December, 1962, and "Treater Oil and Water Valve," Kimary, Inc., September, 1986, both of which are incorporated herein by reference for all purposes. While the invention will be described with refenece to a valve 34 used to control flow of water from the treater tank 12, it will be understood that similar valves are used to control the flow of oil from the tank 12.

The check valve 34 has a lower housing 38 and an upper housing 40. Lower housing 38 is provided with an inlet 42 and an outlet 44. A valve seat, shown generally as 46, and described more fully hereafter, is threadedly received in a threaded bore 48 in lower housing 38. As can be seen, valve seat 46 has a cylindrical bore 50 which is in open communication with outlet 44. In the case where the valve 34 is being used for controlling water flow from the treater tank 12, the separated water would flow through cylindrical bore 50 to outlet 44.

Valve seat 46 has a metallic body portion 52 and an insert 54 which is made of an erosion-resistant synthetic polymeric material. Insert 54 forms an annular, axially facing sealing surface 56 which is distal the end of insert 54 received in body portion 52.

Lower housing 38 is also provided with a laterally outwardly extending peripheral flange 58 while upper housing 40 is provided with a similar, laterally outwardly extending peripheral flange 60. A flexible diaphragm 62 is clamped about its periphery between flanges 58 and 60 by means of a series of nut and bolt combinations 64 extending through registering holes in flanges 58 and 60. Diaphragm 62 is also clamped, centrally thereof, between a diaphragm plate 66 and a disk 68, disk 68 carrying an annular seat element 70 which in turn is clamped between a plug 72 and diaphragm plate 68. A pivot 74 having a port 75 extending therethrough extends through a bore in plug 72 and is threadedly received in a threaded bore 76 in diaphragm plate 66. It will thus be seen that, when the valve 34 is closed, seat element 70 engages the sealing surface 56 formed on insert 54. Diaphragm 62, together with plate 66, disk 68 and seat element 70 serves to separate a chamber 39 formed in lower housing 38 from a chamber 41 formed in upper housing 40.

Diaphragm plate 66 has an upwardly extending neck portion 78 which is internally threaded and receives a threaded diaphragm bolt 80. An annular retainer 82 engages a second diaphragm 84, the combination of diaphragm blot 80 and retainer 82 serving to trap diaphragm 84 between diaphragm plate 78 and retainer 82. Diaphragm 84 also has its periphery clamped between a bonnet 86 having a laterally outwardly extending flange 88, bonnet 86 being secured to upper body portion 40 by means of threaded blots 90 received in bores in bonnet 86 which are in register with threaded bores in upper body portion 40 to thereby form a chamber 87. A pin 92 is slidably received in a bore in diaphragm blot 80, pin 92 having a nose portion which engages pivot 74.

Pin 92 is rotatably secured to a crank 94 which in turn is keyed to a shaft 96 by means of a key 98. Shaft 96 is affixed to a lever arm 98 which carries an adjustable weight 100 which can be moved along lever arm 98 to effect desired closing force on the valve.

Upper housing 40 is also provided with an inlet 41 which is connected by means of a line (not shown) to the gas 16 in treater vessel 12. This gas pressure serves to balance the gas pressure in chamber 39 acting on the water column in annulus 30. In effect, the vessel gas pressure in the chamber 41 acts upwardly on diaphragm 84 to cancel downward pressure on the seat 70. Any downstream pressure acting on the seat 70 is communicated to the chamber 87 through port 75 effectively cancelling any downstream pressure effect on the valve operation. The valve 34 is held in the closed position by means of the lever 98 and weight 100 which via pin 82 pushes down on pivot 74 and moves diaphragm plate 62 as well as seat 70 against sealing surface 56. When the liquid in annulus 30 has a sufficient head to overcome the set level of the weight 100, the seat 70 is lifted off of the sealing surface 56, opening the valve 34 and allowing water to flow out of chamber 39 through outlet 44. As the liquid returns to the set level, the weight 100 moves the valve to again close.

In a typical field operation of a treater tank, one could expect a maximum flow of 120 barrels per day of water/brine passing through valve 34 at a rate of about 67 feet per second, assuming a 35 psi drop in the valve. This high flow rate results in cavitation which is highly erosive to the sealing surfaces on prior art seat constructions. If the erosion is severe enough, seat 70 cannot effectively engage sealing surface 56 causing loss of the water seal and permitting gas 16 to escape to the water collection tanks. Assuming a price of approximately $1.80 per thousand cubic feet, the loss can amount to several hundred dollars per day in the system.

A typical example of a prior art valve seat which has undergone erosion in the manner described above is shown in FIG. 3. The valve seat shown generally as 102 is of metallic construction and has a body 103 which defines a cylindrical bore 104 therethrough. The first end 106 of the valve seat 102 defines a generally annular, axially facing sealing surface 108, while the second end 110 of the valve seat 102 is threaded as shown at 112 for purposes of mounting the valve seat in the valve 34. Body 103 is provided with lugs 114 and 116 which project laterally outwardly from body 103 and serve as engagement means for a tool to install and remove valve insert 102. As can be seen, an area of an erosion designated as 118 has partially destroyed sealing surface 108 with the result that seat 70 cannot effectively form a fluid-tight seal thereby allowing valuable quantities of natural gas to escape.

In order to stop the loss of natural gas, seat 102 would normally have to be removed and replaced with a new valve seat which is quite expensive. To overcome this problem, Applicant has discovered that valve seat 102 can be effectively repaired and converted into a modified but highly usable replacement valve seat. To this end, a portion of first end 106 is removed sufficient to eliminate eroded area 118, i.e. at least the area of the sealing surface 108 which has also eroded. Next, a new counterbore 120 which is concentric with cylindrical bore 104 is formed in what may now be defined as the new first end 106a of body 103. A valve insert shown generally as 122 is then formed of an erosion-resistant plastic or synthetic polymeric material, insert 122 having a first portion 124 with first inner and outer concentric cylindrical surfaces 126 and 128, respectively. Valve insert 122 also has a second portion 130 defining second inner and outer concentric, cylindrical surfaces 132 and 134, respectively. It should be observed that surfaces 126, 128, 130 and 132 are concentric with respect to one another and with respect to cylindrical bore 104. Outer surface 134 of second portion 130 has a diameter which is sufficiently less than the diameter of the new counterbore 120 so as to permit the insertion of second portion 130 into counterbore 120 but is sufficiently large enough relative to the diameter of new counterbore 120 to prevent any substantial lateral movement of the insert 122 in the counterbore 120. In effect, second portion 130 is sized so as to slidably but snugly fit in counterbore 120. Second inner cylindrical surface 132 has a diameter substantially the same as the diameter of cylindrical bore 104 thereby forming a smooth uninterrupted flowpath. The first outer cylindrical surface 128 on first portion 124 has a diameter greater than the diameter of new counterbore 120 to ensure that the radial thickness of the first portion 124 is sufficient to form a new sealing surface 136 which will be engaged by the seat 70 and also to provide sufficient structural integrity of the insert 122 above the body 103. Generally, counterbore 120 will be formed with an axial depth D terminating at an annular shoulder 121 which is substantially equal to the axial length of second portion 130. To secure insert 122 into body 103, second portion 130 is positioned in counterbore 120 together with a suitable adhesive, such as is shown at 140, which will effectively bond insert 122 to body 103, fill in any gap between the shoulder 121 and the end of second portion 130 and form a fluid-tight seal between body 103 and insert 122.

The advantages of repairing the valve seat 102 to form the modified valve seat 102a are many. For one, it is unnecessary to replace valve seat 102 with an entirely new and expensive valve seat. Secondly, should the valve seat 122 erode, it can be easily removed from body 103 simply by burning out the insert 122 and the adhering adhesive 140. Another insert 122 can then be repositioned and glued in the body 103 with a suitable adhesive, and the valve seat 102a reused.

Numerous materials can be used in constructing the insert 122. Generally speaking, insert 122 will be formed of a plastic or synthetic polymeric material which is erosion-resistant, i.e. is resistant to fail when subjected to cavitation resulting from high flow rates through the valve. Non-limiting examples of such suitable synthetic polymeric materials include nylon polymers as, for example, materials such as Monocast and Nylatron, GSM nylons manufactured by The Polymer Corporation, acetal resins, such as Delrin manufactured by DuPont, thermoplastic carbonate linked polymers, such as Lexan manufactured by General Electric Co., and numerous other thermoplastic and thermosetting resins or resin compositions which are erosion-resistant. The inserts can be formed of synthetic polymeric materials alone or in admixture with various fillers, binders, etc. which enhance the erosive resistant nature of the material.

Although epoxy resins are a preferred adhesive for bonding the insert to the body, it will be appreciated that numerous other type adhesives which are effective to bond various synthetic polymeric materials or plastics to metals can also be employed.

While the valve insert has been described above with respect to the bonding of the plastic, erosion-resistant insert to the body, it will be appreciated that the second portion of the insert, i.e. the portion that is received in the counterbore of the body, can be threaded and the counterbore in the body also matingly threaded such that the second portion of the insert can be screwed into the counterbore thereby securing the insert to the body in fluid-tight engagement. Indeed, if the valve inserts were being manufactured as new valve inserts, this might well be a preferred method of forming the insert and securing it to the body since the plastic insert could be easily molded to have male threads, while the counterbore in the body could be easily provided with female threads. However, in the case where repair of an eroded valve seat is carried out, it has been found preferred to construct the valve seat as described above, i.e. by bonding the second portion of the insert to the valve body by means of an adhesive which forms a fluid-tight seal between the second portion of the insert and the body.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A diaphragm valve and seat assembly useable with a three phase treater, comprising:
   a cylindrical tank having a base end and a second end opposite said base end, said tank having an emulsion inlet to allow entry into said tank of an emulsion comprising oil, water, and gas, said water separating from said emulsion towards said base end of said tank, said gas separating from said emulsion toward said second end of said tank, said oil separating from said emulsion towards a position between said water and said gas;
   a water outlet disposed adjacent to said base end of said tank;
   an equalizing line disposed adjacent to said second end of said tank;
   a syphon tube juxtapositioned outside of said tank, said syphon tube having a water inlet end adjacent said base end of said tank and a gas inlet end adjacent said second end of said tank, said syphon tube having internal surfaces, said syphon tube having an opening for a syphon leg in said water inlet end of said syphon tube so that water may flow from said tank to said syphon tube, said syphon leg extending from said water outlet into said syphon tube and terminating inside of said syphon tube, said equalizing line connecting proximate said gas inlet end of said syphon tube so that gas may flow between said tank and said syphon tube, said syphon tube further including an annulus between said syphon leg and said internal surfaces, said annulus having an outlet proximate to said water inlet end of said syphon tube, said annulus having a water pressure at said annulus outlet which increases as the amount of water in said syphon tube annulus increases; and a diaphragm valve comprising, an upper and lower housing internally separated by a flexible diaphragm, said lower housing of said valve being connected by conduit to said syphon tube outlet so that water under said water pressure may flow from said syphon tube annulus into said lower housing of said valve, said flexible diaphragm having a centrally positioned seating element facing into said lower housing, said lower housing further having an outlet, an upwardly extending valve seat removably secured to said lower housing so that it is in communication with said lower housing outlet, said valve seat being made of an erosion-resistant material, said valve seat having a body with a generally cylindrical bore therethrough, said body having a first end and a second end, said first end having a counterbore concentric with said cylindrical bore and having an axial depth D, means on said second end of said body for mounting said valve seat onto said lower housing, an insert carried by said body and received in said first end, said insert being comprised of a corrosion and erosion-resistant, synthetic polymeric material and having a passageway therethrough, said insert having a first portion defining first inner and outer concentric cylindrical surfaces, said first outer surface having a diameter greater than the diameter of said counterbore and being supportingly seated on said first end, an annular sealing surface being formed on said first portion, a second generally cylindrical portion, said second portion being received in said counterbore, means disposed between said body and said second portion of said insert to secure said second portion of said insert to said body within said counterbore and effect fluid-tight sealing between said second portion and said body, said flexible diaphragm pressing said seating element against said annular sealing surface on said first portion of said valve seat insert with an adjustable force to thereby seal said valve, said valve opening when said water pressure acts to lift said flexible diaphragm by overcoming said adjustable force.

2. A diaphragm valve and seat assembly as described in claim 1, wherein said valve seat further comprises:

second inner and outer concentric cylindrical surfaces defined by said second portion of said valve seat insert, the diameter of said second outer surface being sufficiently less than the diameter of said counterbore to permit said second portion to be received in said counterbore but sufficiently large enough to prevent any substantial lateral movement of said second portion relative to said counterbore, and said means to secure said second portion to said body comprising an adhesive.

3. A diaphragm valve and seat assembly as described in claim 2, wherein the diameter of said first inner cylindrical surface of said valve seat insert is greater than the diameter of said second inner cylindrical surface.

4. A diaphragm valve and seat assembly as described in claim 2, wherein said adhesive for said valve seat insert comprises an epoxy resin.

5. A diaphragm valve and seat assembly as described in claim 2, wherein said second inner cylindrical surface of said valve seat insert has a diameter substantially the same as the diameter of said cylindrical bore.

6. A diaphragm valve and seat assembly as described in claim 1, wherein said second portion of said valve seat insert has an axial length substantially equal to D.

7. A diaphragm valve and seat assembly as described in claim 1, wherein said valve seat insert is comprised of a nylon polymer.

* * * * *